United States Patent
Molinsky et al.

(10) Patent No.: US 8,655,686 B2
(45) Date of Patent: Feb. 18, 2014

(54) SYSTEM AND METHOD FOR PROVIDING SUPPLEMENTAL BUNDLED INSURANCE

(75) Inventors: Bradley D. Molinsky, Bloomfield, CT (US); Damien D. Balazs, West Hartford, CT (US); Gordon Hui, Boyds, MD (US); Carmen L. Sharp, North Granby, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 45 days.

(21) Appl. No.: 13/279,678

(22) Filed: Oct. 24, 2011

(65) Prior Publication Data

US 2013/0103428 A1    Apr. 25, 2013

(51) Int. Cl.
*G06Q 40/00* (2012.01)
(52) U.S. Cl.
USPC ................................. 705/4; 705/44
(58) Field of Classification Search
USPC .......................................................... 705/4
See application file for complete search history.

(56) References Cited

U.S. PATENT DOCUMENTS

| | | | |
|---|---|---|---|
| 5,191,522 A * | 3/1993 | Bosco et al. ...................... 705/4 |
| 5,557,515 A * | 9/1996 | Abbruzzese et al. ......... 705/7.15 |
| 2003/0154098 A1* | 8/2003 | Kalnas et al. .................... 705/1 |
| 2009/0204441 A1* | 8/2009 | Read et al. ........................ 705/4 |
| 2010/0179839 A1* | 7/2010 | Collins et al. .................... 705/4 |
| 2011/0055060 A1 | 3/2011 | Marcia |
| 2013/0013344 A1 | 1/2013 | Ernstberger et al. |

* cited by examiner

*Primary Examiner* — Hai Tran
(74) *Attorney, Agent, or Firm* — Howard IP Law Group, PC

(57) ABSTRACT

According to some embodiments, a workers' compensation insurance premium may be calculated for a workers' compensation insurance policy covering a group of employees employed by an employer. Moreover, supplemental bundled insurance premiums may be calculated for each employee to provide individual, supplemental bundled insurance policies. The supplemental bundled insurance premiums may be contingent upon the employer's agreement to pay the workers' compensation insurance premium. By way of examples, the supplemental bundled insurance policies might be associated with one or more of short term disability insurance, long term disability insurance, accidental death insurance, accidental disability insurance and/or hospital accident insurance.

21 Claims, 10 Drawing Sheets

| EMPLOYEE IDENTIFIER 402 | AGE AND GENDER 404 | NAME 406 | JOB TITLE 408 | CLAIM HISTORY 410 |
|---|---|---|---|---|
| EE_101 | 34 - F | JANE DOE | MANAGER | NONE |
| EE_102 | 52 - M | SAM WEST | DRIVER | 1/13/2011 - $5,000 (WC) |
| EE_103 | 25 - F | JADE MILES | DRIVER | NONE |
| EE_104 | 46 - F | SANDRA JONES | MANAGER | 12/15/1010 - $2,500 (STD) |
| EE_105 | 21 - M | WILLIAM GREEN | CLERK | NONE |

*FIG. 4*

| POLICY IDENTIFIER 502 | INSURED 504 | TYPE OF INSURANCE 506 | PREMIUM (MONTHLY) 508 | INSURANCE POLICY DETAILS 510 | CLAIM HISTORY 512 |
|---|---|---|---|---|---|
| P_101 | ER_101 | WORKERS' COMPENSATION | $50,000.00 | 55 WORKERS | C_101, C_102, C_103.... |
| P_201 | EE_101 | LIFE | $50.00 | $250,000 POLICY | NONE |
| P_301 | EE_101 | SHORT TERM DISABILITY | $100.00 | 80% SALARY FOR 3 MONTHS | NONE |
| P_202 | EE_102 | LIFE | $100.00 | $250,000 POLICY | NONE |
| P_402 | EE_102 | LONG TERM DISABILITY | $200.00 | 60% SALARY FOR 2 MONTHS | C_401 |

SYSTEM AND METHOD FOR PROVIDING SUPPLEMENTAL BUNDLED INSURANCE

BACKGROUND

An employer may purchase workers' compensation insurance for employees. For example, an insurance company may evaluate the number of employees who work for the employer along with their salaries and calculate a worker's compensation insurance premium to be paid by the employer. Note that employees may also be interested in other types of insurance (e.g., accidental death or accidental disability insurance). These other types of insurance, however, are not connected to the employer's workers compensation insurance policy. As a result, multiple parties associated with the employer may need to be involved with the purchase and/or offering of insurance products (e.g., both a human resources manager and a risk manager). This can increase the administrative overhead associated with the education, enrollment, etc. of the insurance policies. Moreover, because different types insurance policies might be associated with similar occurrences (e.g., when an employee is injured at work as compared to when an employee is injured at home), different claims processing experiences, back-to-work programs, etc. can be required, and such an approach can be confusing for employees.

It would be desirable to provide systems and methods to facilitate a workers' compensation program along with supplemental bundled insurance policies automated, efficient, and accurate manner.

SUMMARY OF THE INVENTION

According to some embodiments, systems, methods, apparatus, computer program code and means may be provided to facilitate a workers' compensation program along with supplemental bundled insurance policies. In some embodiments, an integrated benefits management platform may support both the workers' compensation program and the supplemental bundled insurance policies.

According to some embodiments, a workers' compensation insurance premium may be calculated for a workers' compensation insurance policy covering a group of employees employed by an employer. Moreover, supplemental bundled insurance premiums may be calculated for each employee to provide individual, supplemental bundled insurance policies. The supplemental bundled insurance premiums may be contingent upon the employer's agreement to pay the workers' compensation insurance premium. By way of examples, the supplemental bundled insurance policies might be associated with one or more of short term disability insurance, long term disability insurance, accidental death insurance, accidental disability insurance, and/or hospital accident insurance.

Some embodiments provide: means for receiving a data file including employee records associated with a group of employees employed by an employer; means for evaluating the employee records to calculate a workers' compensation insurance premium for a workers' compensation insurance policy covering the group of employees; means for evaluating the employee information to calculate supplemental bundled insurance premiums to provide individual, supplemental bundled insurance policies for employees, wherein the supplemental bundled insurance premiums are contingent upon the employer's agreement to pay the workers' compensation insurance premium and are associated with at least two of: (i) short term disability insurance, (ii) long term disability insurance, (iii) accidental death insurance, (iv) accidental disability insurance and/or (iv) hospital accident insurance; and means for transmitting indications of the workers' compensation insurance premium and supplemental bundled insurance premiums.

A technical effect of some embodiments of the invention is an improved and computerized method to facilitate a workers' compensation program along with supplemental bundled insurance policies. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 4 is a tabular portion of an employee file according to some embodiments.

DESCRIPTION

An insurance company may evaluate the number of employees who work for the employer along with their salaries and calculate a worker's compensation insurance premium to be paid by the employer. Note that employees may also be interested in other types of insurance (e.g., accidental death or accidental disability insurance). These other types of insurance, however, may not be connected to the employer's workers compensation insurance policy, and multiple parties associated with the employer may need to be involved with the purchase and/or offering of insurance products. This can increase the administrative overhead associated with the education, enrollment, etc. of the insurance policies. Moreover, because different types of insurance policies might be associated with similar occurrences, different claims processing experiences, back-to-work programs, etc. can be required and such an approach can be confusing for employees.

Figure 1:
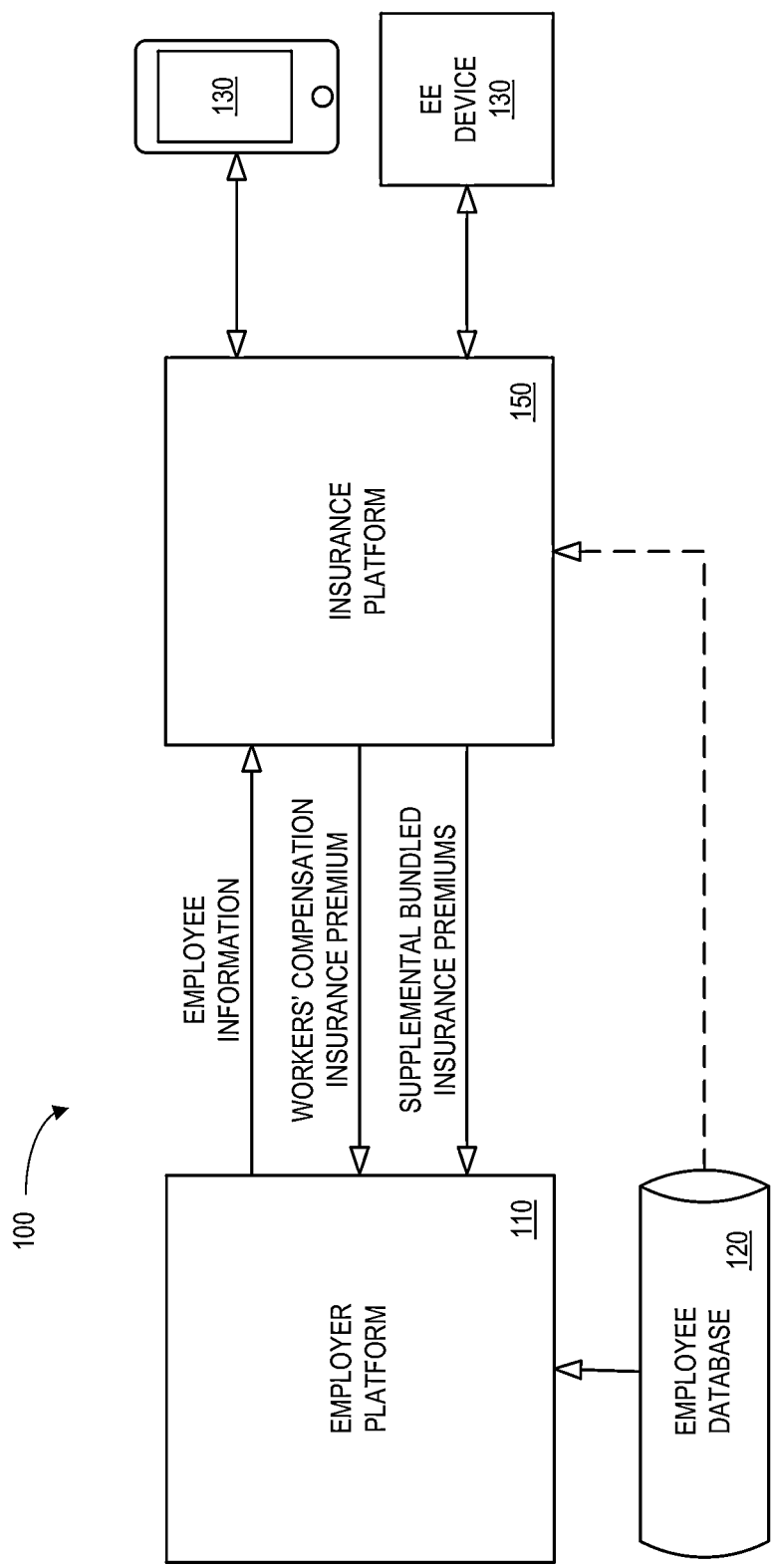
FIG. 1 is block diagram of a system according to some embodiments of the present invention.

To improve the process or making insurance policies available, FIG. 1 is a block diagram of a system 100 according to some embodiments of the present invention. In particular, an employer platform 110 may have access to employee information stored in an employee database 120. The employee information might comprise, for example, a total number of employees, individual employee names, ages, genders, job titles, income, etc. The employee database 120 might be locally stored or received from another system or device. The employer platform 110 or other devices described herein might be, for example, associated with a Personal Computers (PC), laptop computer, an enterprise server, a server farm, and/or a database or similar storage devices. The employer platform 110 may, according to some embodiments, be associated with an employer or a third-party service that administers benefits for employees.

According to some embodiments, an "automated" insurance platform 150 may receive employee information from the employer platform 110. As used herein, the term "automated" may refer to, for example, actions that can be performed with little or no human intervention.

As used herein, devices, including those associated with the insurance platform 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks. According to some embodiments, the insurance platform 150 may also access information directly from the employee database (e.g., as illustrated by the dashed arrow in FIG. 1). According to still other embodiments, the insurance platform 150 may instead receive employee information from one or more employee devices 130 (e.g., web portals or telephone call centers). Although a single insurance platform 150 is shown in FIG. 1, any number of such devices may be included. Moreover, various devices described herein might be combined according to embodiments of the present invention.

Figure 2:
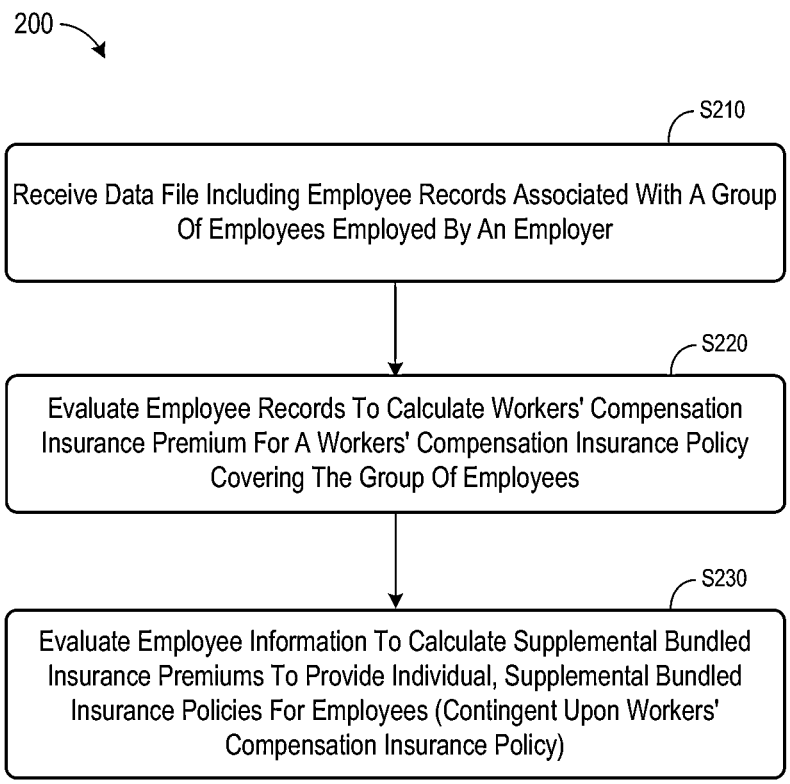
FIG. 2 illustrates a method according to some embodiments of the present invention.

To supplement aspects of a workers' compensation program, the insurance platform 150 may calculate both a workers' compensation insurance premium and supplemental bundled insurance premiums. For example, FIG. 2 illustrates a method that might be performed, for example, by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a data file may be received by an insurance platform. The data file may, for example, include employee records associated with a group of employees employed by an employer. At S220, the insurance platform may automatically evaluate the employee records to determine a workers' compensation insurance premium for a workers' compensation insurance policy covering the group of employees. The premium might be based on, for example, the total number of employees and/or employee salaries.

At S230, the insurance platform may automatically evaluate the employee records to determine supplemental bundled insurance premiums to provide individual, supplemental bundled insurance policies for employees. Note that the supplemental bundled insurance premiums may be contingent upon the employer's agreement to pay the workers' compensation insurance premium. The supplemental bundled insurance premiums may associated with, for example, one or more of short term disability insurance, long term disability insurance, accidental death insurance, accidental disability insurance and/or hospital accident insurance. According to some embodiments, the supplemental bundled insurance premiums may be associated with different packages combing these types of insurance (e.g., a package might add both life and short term disability insurance for an employee).

According to some embodiments, the supplemental bundled insurance premium is to be paid by each employee who may voluntarily indicate whether he or she wants to purchase the supplemental bundled insurance coverage. Moreover, note that different supplemental bundled insurance premiums may be determined for different employees (e.g., a higher accidental disability insurance premium might be determined for an older employee). Further note that the supplemental bundled insurance policies may be "portable" and owned by employees (e.g., the coverage might continue even when an employee changes jobs). According to some embodiments an employee might elect to have his or her spouse also be covered by the insurance policy.

According to some embodiments, the supplemental bundled insurance premiums are based at least in part on historical workers' compensation insurance claims associated with the employer. For example, a relatively safe work environment (as indicated by historical workers' compensation insurance claims) might result in lower supplemental bundled insurance premiums. Similarly, according to some embodiments, the workers' compensation insurance premium could be based at least in part on historical supplemental bundled insurance claims associated with the group of employees.

Figure 3:
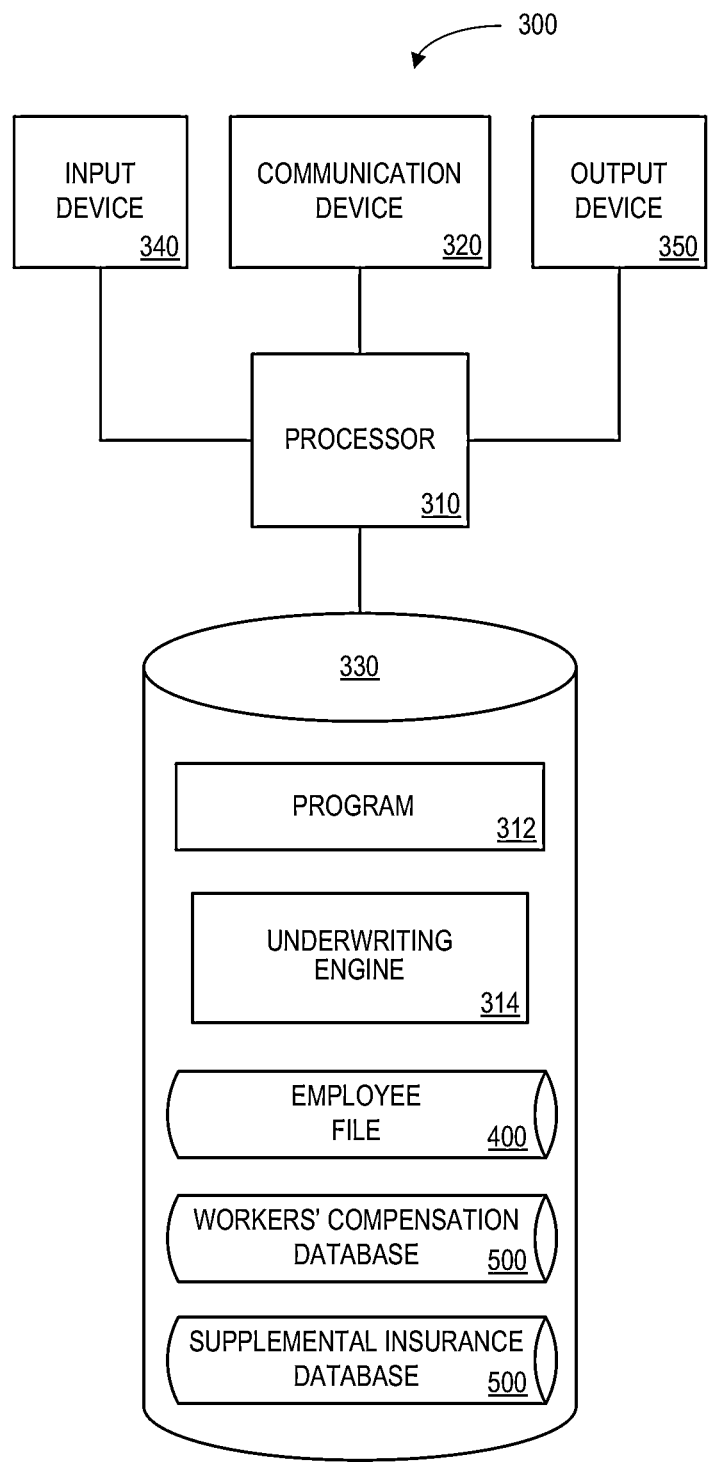
FIG. 3 is block diagram of an insurance platform according to some embodiments of the present invention.

The process of FIG. 2 may be implemented using any number of different hardware configurations. For example, FIG. 3 illustrates an insurance platform 300 that may be, for example, associated with the system 100 of FIG. 1. The insurance platform 300 comprises a processor 310, such as one or more commercially available Central Processing Units (CPUs) in the form of one-chip microprocessors, coupled to a communication device 320 configured to communicate via a communication network (not shown in FIG. 3). The communication device 320 may be used to communicate, for example, with one or more remote employer platforms and/or employee devices. The insurance platform 300 further includes an input device 340 (e.g., a mouse and/or keyboard to enter underwriting rules or pricing algorithms) and an output device 350 (e.g., a computer monitor to display aggregated underwriting results to an administrator).

The processor 310 also communicates with a storage device 330. The storage device 330 may comprise any appropriate information storage device, including combinations of magnetic storage devices (e.g., a hard disk drive), optical storage devices, mobile telephones, vehicle computers, and/or semiconductor memory devices. The storage device 330 stores a program 312 and/or underwriting engine 314 for controlling the processor 310. The processor 310 performs instructions of the programs 312, 314, and thereby operates in accordance with any of the embodiments described herein. For example, the processor 310 may calculate a workers' compensation insurance premium for a workers' compensation insurance policy covering a group of employees employed by an employer. Moreover, the processor 310 may calculate supplemental bundled insurance premiums for each employee to provide individual, supplemental bundled insurance policies. The supplemental bundled insurance premiums may be contingent upon the employer's agreement to pay the workers' compensation insurance premium. By way of examples, the supplemental bundled insurance policies might be associated with one or more of short term disability insurance, long term disability insurance, accidental death insurance, accidental disability insurance and/or hospital accident insurance The programs 312, 314 may be stored in a compressed, uncompiled and/or encrypted format. The programs 312, 314 may furthermore include other program elements, such as an operating system, a database management system, and/or device drivers used by the processor 310 to interface with peripheral devices.

As used herein, information may be "received" by or "transmitted" to, for example: (i) the insurance platform 300 from another device; or (ii) a software application or module within the insurance platform 300 from another software application, module, or any other source.

In some embodiments (such as shown in FIG. 3), the storage device 330 stores an employee file 400 and workers' compensation and supplemental insurance databases 500. Examples of the databases 400, 500 that might be used in connection with the insurance platform 300 will now be described in detail with respect to FIGS. 4 and 5. Note that the databases 400, 500 described herein are only examples, and additional and/or different information may be stored therein. Moreover, various databases might be split or combined in accordance with any of the embodiments described herein.

FIG. 4 illustrates a tabular portion of an employee file 400 that might be used in accordance with some embodiments. The table may include, for example, records identifying employees who are employed by an employer. The table may also define fields 402, 404, 406, 408, 410 for each of the entries. The fields 402, 404, 406, 408, 410 may, according to some embodiments, specify: an employee identifier 402, an employee age and gender 404, an employee name 406, an employee job title 408, and an employee claim history 410. The information in the employee file 400 may be created and updated, for example, based on information received from a remote employer platform.

The employee identifier 402 may be a unique alphanumeric code identifying an employee who works for an employer. The employee age and gender 404, employee name 406, and employee job title 408 may provide information about that employee. According to some embodiments, an employee claim history 410 may also be included in the employee file 400 (e.g., indicating dates and/or amounts associated with prior insurance claims made by that employee).

Figure 5:
FIG. 5 is a tabular portion of a workers' compensation and supplemental insurance database in accordance with some embodiments.

FIG. 5 illustrates a tabular portion of a workers' compensation and supplemental bundled insurance database 500 that might be used in accordance with some embodiments. The table may include, for example, entries identifying insurance policies. The table may also define fields 502, 504, 506, 508, 510, 512 for each of the entries. The fields 502, 504, 506, 508, 510, 512 may, according to some embodiments, specify: a policy identifier 502, an insured 504, a type of insurance 506, a monthly premium 508, insurance policy details 510, and a claim history. The information in the workers' compensation and supplemental bundled insurance database 500 may be created and updated, for example, based on information generated by an insurance platform.

The policy identifier 502 may be a unique alphanumeric code identifying an insurance policy. The insured 504 might indicate the party who is covered by the insurance policy (e.g., an employer or employee identifier). The type of insurance 506 might indicate, for example, that the policy is associated with workers' compensation, life, or short term disability insurance. The monthly premium 508 may indicate the cost of the insurance policy and the insurance policy details 510 may define benefits associated with the policy. According to some embodiments, a policy claim history 412 may also be included in the database 500 (e.g., claim identifiers associated with prior insurance claims made under that particular policy).

Figure 6:
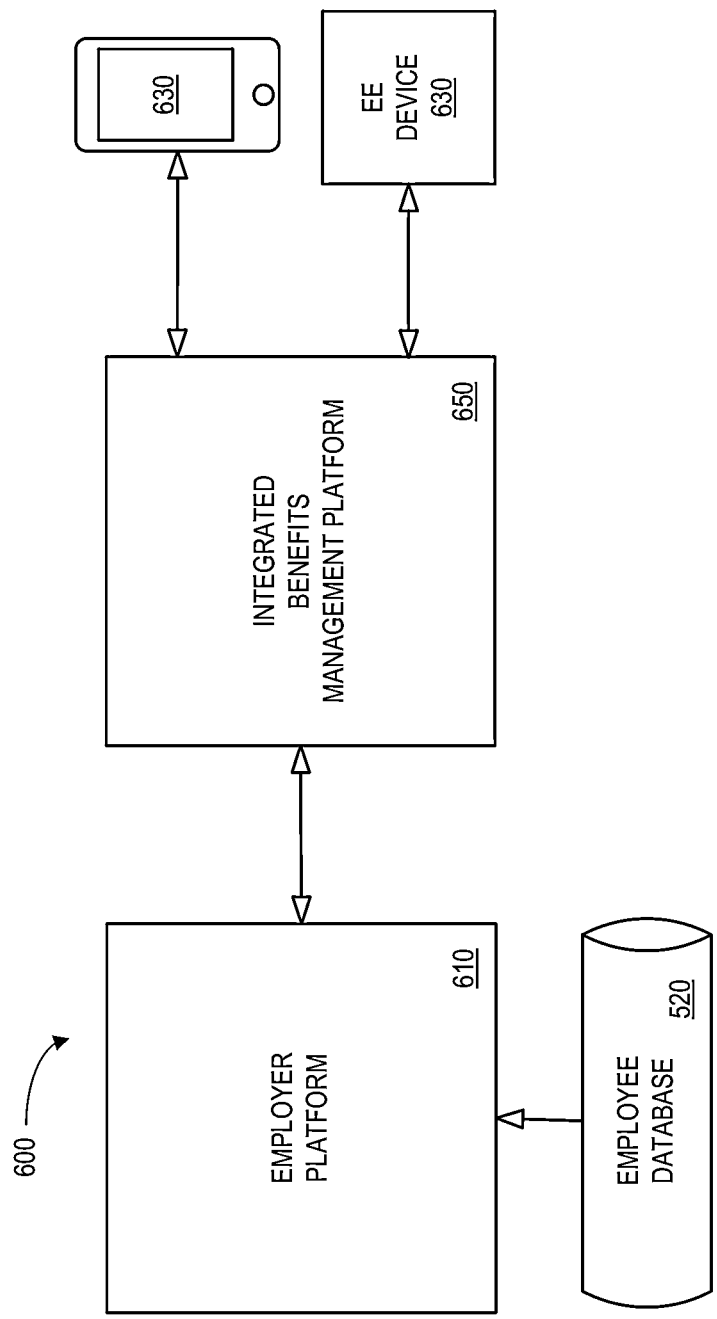
FIG. 6 is block diagram of a system according to another embodiment of the present invention.

Note that combining a workers' compensation program with supplemental bundled insurance benefits may provide some advantages. For example, FIG. 6 is block diagram of a system 600 according to another embodiment of the present invention. As with FIG. 1, an employer platform 610 may have access to employee information stored in an employee database 620. The employee information might comprise, for example, a total number of employees, individual employee names, ages, genders, job titles, income, etc. The employee database 620 might be locally stored or received from another system or device. According to some embodiments, an automated integrated benefits management platform 650 may receive employee information from the employer platform 110. The integrated benefits management platform 650 may also access information insurance policies, including those associated with the employer and those associated with employees.

According to some embodiments, the insurance platform 650 may also receive employee information from one or more employee devices 630 (e.g., web portals or telephone call centers). Although a single integrated benefits management platform 650 is shown in FIG. 1, any number of such devices may be included. Moreover, various devices described herein might be combined according to embodiments of the present invention.

Figure 7:
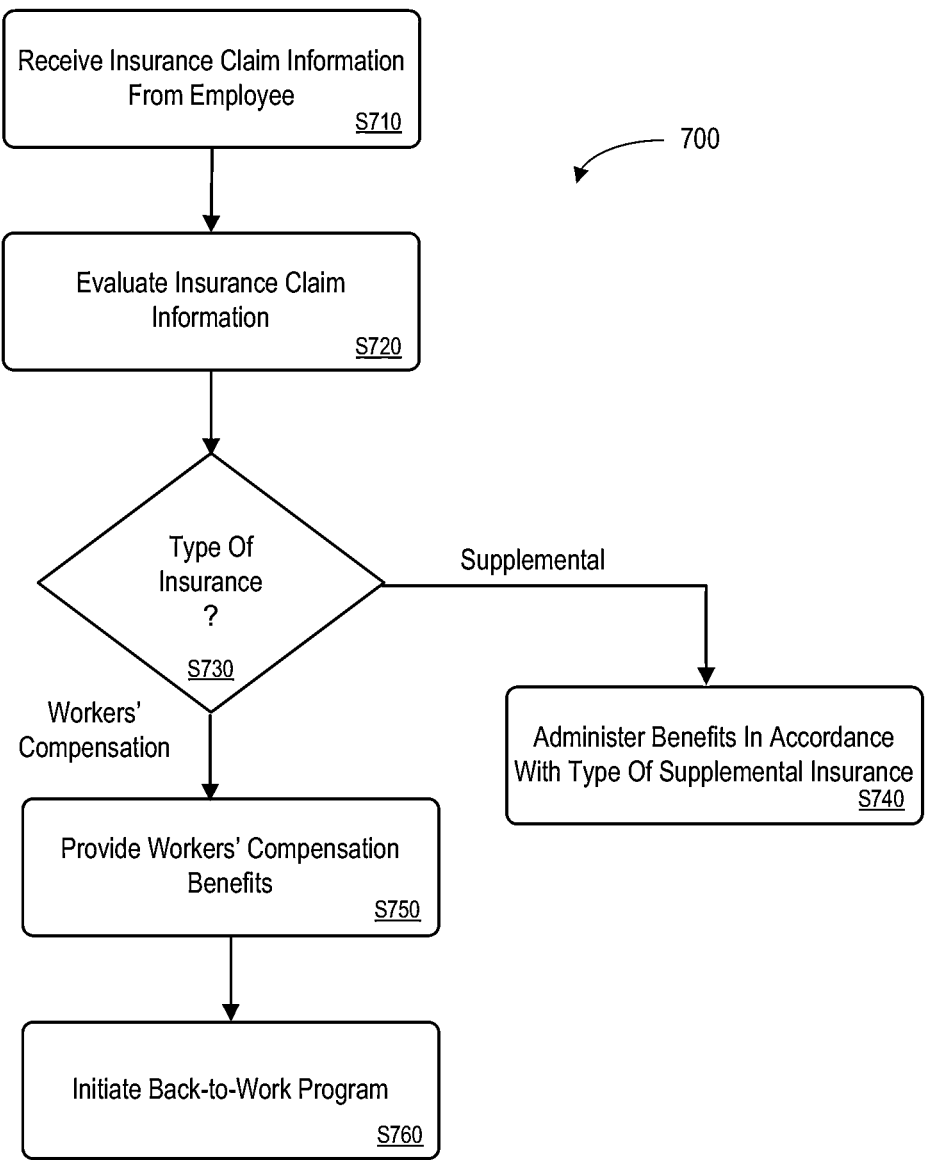
FIG. 7 illustrates a method according to another embodiment of the present invention.

FIG. 7 illustrates a method that might be performed, for example, by some or all of the elements of the system 700 described with respect to FIG. 7 according to some embodiments of the present invention. At S710, an integrated benefits management platform may receive information about a claim from a first employee. For example, an employee might submit claim information via a web portal or a telephone call center. At S720, the information about the claim may be evaluated. For example, the time and place of an injury might ascertained to determine whether the claim is associated with the employer's workers' compensation insurance policy or the employee's supplemental bundled insurance policy.

If it is determined at S730 that the claim is the employee's supplemental bundled insurance policy, then the integrated benefits insurance platform might administer benefits in accordance with the appropriate supplemental insurance policy at S740. If it is instead determined at S730 that the claim is the employer's workers' compensation insurance policy, the workers' compensation benefits may be provided at S750 and a back-to-work program might be initiated at S760. According the some embodiments, the method 700 may further include fraud detection and similar types of insurance claims processing features.

In this way, relatively seamless disability coverage (e.g., for medical expenses and/or lost income) may be provided to employees (e.g., both when they are at work and not at work). In addition, an employer may utilize a single solution that implements a smooth experience from claims processing through a back-to-work program for employees. According to some embodiments, the supplemental bundled insurance may be presented as a single product (with a single premium), and there may be little distinction been occupational and non-occupational injuries.

Figure 8:
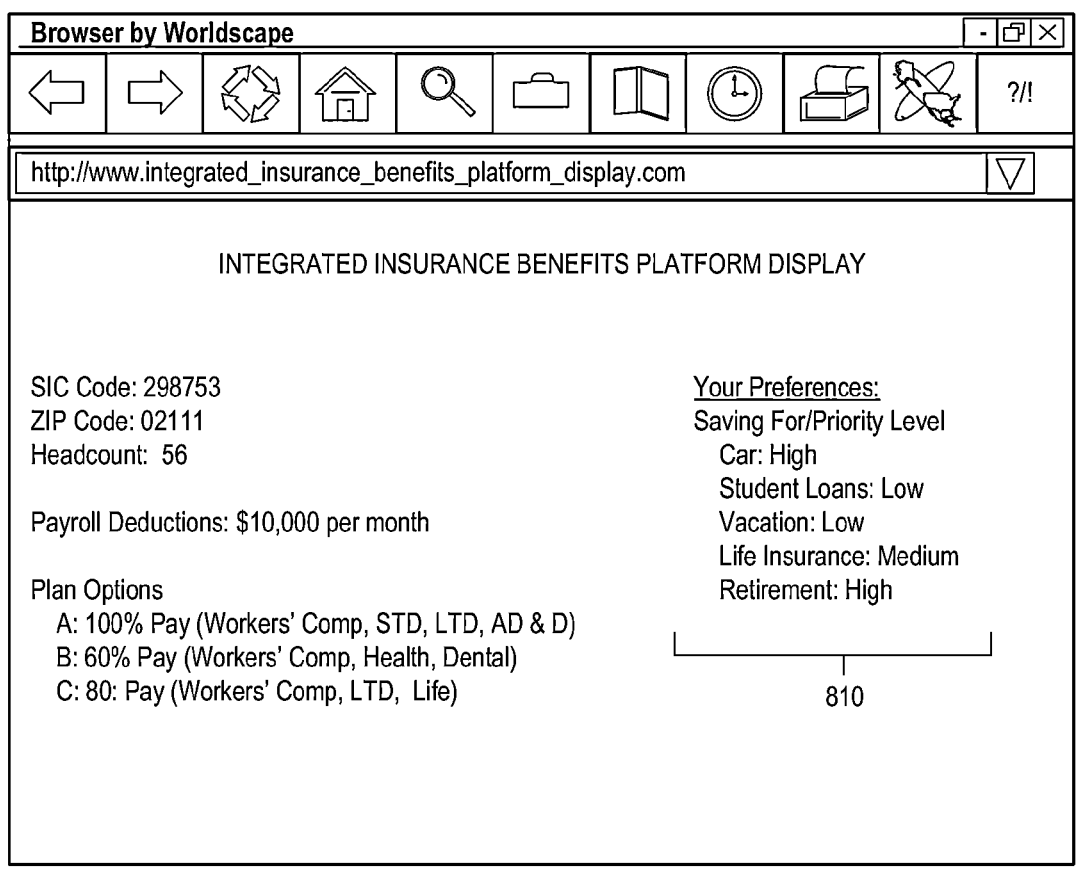
FIG. 8 illustrates an employee web interface in accordance with some embodiments described herein.

The integrated benefits management platform 650 may be used by employers and employees to view and change insurance policies. For example, FIG. 8 illustrates an employee web interface 800 in accordance with some embodiments described herein. According to some embodiments, the integrated benefits management platform 650 may receive, from employees, adjustments to the supplemental bundled insurance policies. For example, the web interface 800 might be used to select a different plan option (e.g., from 100% pay to 80% pay) and/or change a payroll deduction frequency. According to some embodiments, premium payments may be automatically deducted and the need for an end-of-year workers' compensation audit may be reduced. Moreover, according to some embodiments, different companies might be pooled to enable discounts based on the increased number of participants. The integrated benefits management platform 650 may also, according to some embodiments, automate workers' compensation and/or unemployment registrations and/or filings with governmental entities.

The web interface 800 may include a user preference portion 810 that may help employees manage benefit dollars (e.g., different users may have different priorities for their savings needs). In this way, the web interface may facilitate the appropriate allocation and/or payment of the supplemental bundled insurance premiums by employees.

Figure 9:
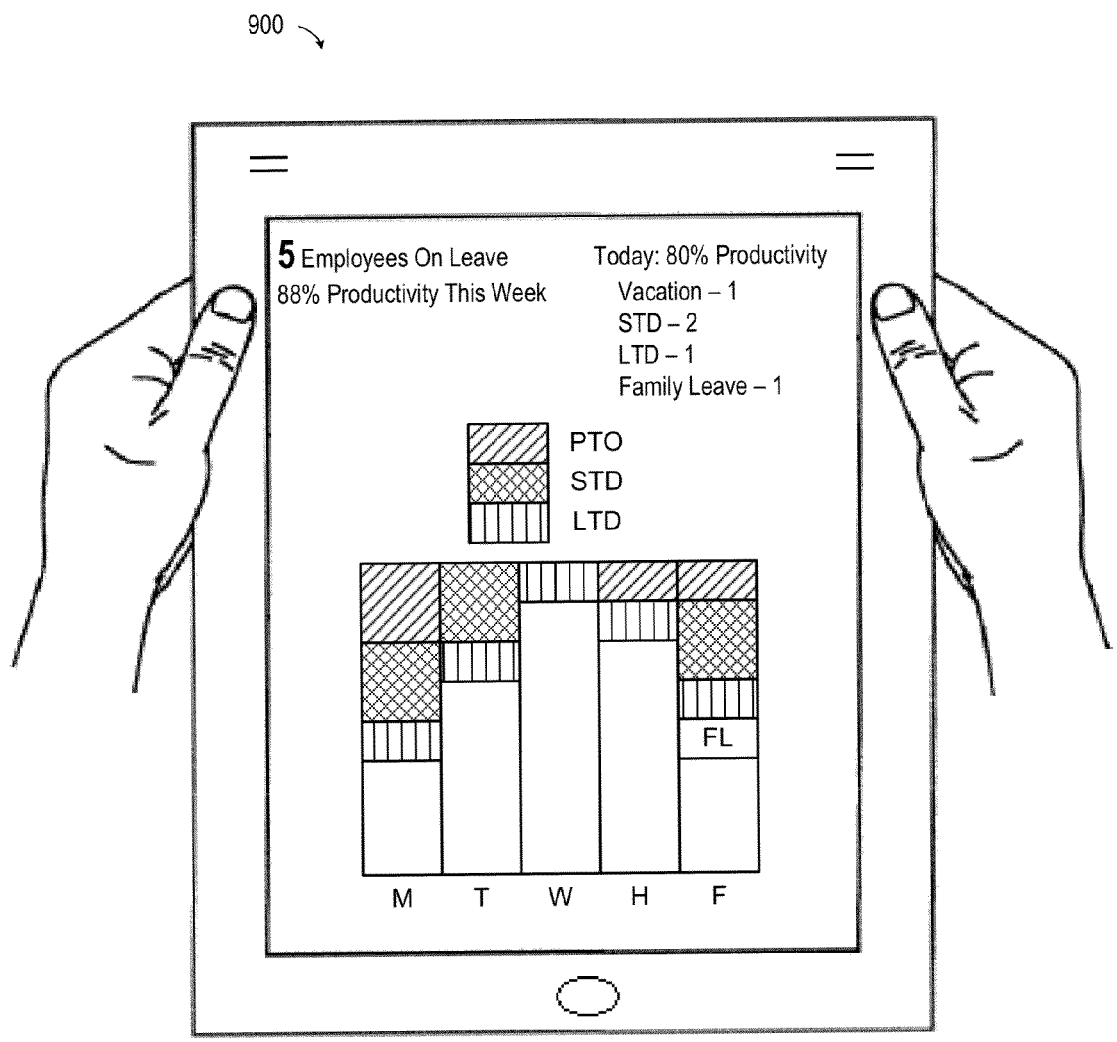
FIG. 9 illustrates an employer display on a handheld device in accordance with some embodiments described herein.

According to some embodiments, the integrated benefits management platform 650 may provide a graphical user interface displaying aggregated information including information about both workers' compensation insurance claims and supplemental bundled insurance claims (e.g., to a manager who works for the employer). For example, FIG. 9 illustrates an employer display 900 on a handheld device in accordance with some embodiments described herein. The display 900 graphically shows how many employees are currently on leave along with the reasons why they are on leave (e.g., on short term or long term disability leave). According to some embodiments, the display 900 may further allow a manager to run a report listing an estimated value of lost work and/or dependencies associated with employees returning to work.

According to some embodiments, the integrated benefits management platform 650 may generate a rating associated with the employer or employee in accordance with both workers' compensation insurance claims and/or supplemental bundled insurance claims. For example, an enterprise might be evaluated and rated as a "gold," "silver," or "bronze" enterprise based on a number of workers' compensation claims that have been filed in the previous year and/or employer practices. Similar evaluations might be associated with employee safety, happiness, tenure, and/or benefits. Note that different bundles might be offered in connection with different industries and/or geographic locations. For example, a "silver" bundle for a dry cleaning store in New York might be associated with different deductibles as compared to a "silver" bundle for a construction firm in California.

By way of example only, a "gold" insurance package might be associated with a $100,000 lump sum accidental death plan, a $1,000 per month accidental disability plan, a $100 per day hospital accident plan, and a $20 per month premium per person. A "bronze" insurance package might be associated with a $50,000 lump sum accidental death plan, a $500 per month accidental disability plan, a $50 per day hospital accident plan, and a $10 per month premium per person.

According to some embodiments, the integrated benefits management platform 650 may coordinate a return-to-work program associated with both the workers' compensation insurance policy and the supplemental bundled insurance policies. Similarly, the integrated benefits management platform 650 might coordinate a wellness program associated with both the workers' compensation insurance policy and the supplemental bundled insurance policies. For example, the integrated benefits management platform 650 might track employee gym visits and provide a personalized employee health and wellness program to improve employer claims losses and productivity (e.g., employees might compete as teams to see which team exercises more frequently or has the healthiest average body mass index). According to some embodiments, social networks may further be used to promote goals and targets for a wellness program (e.g., trophies or badges could be awarded to employees who participate).

Figure 10:
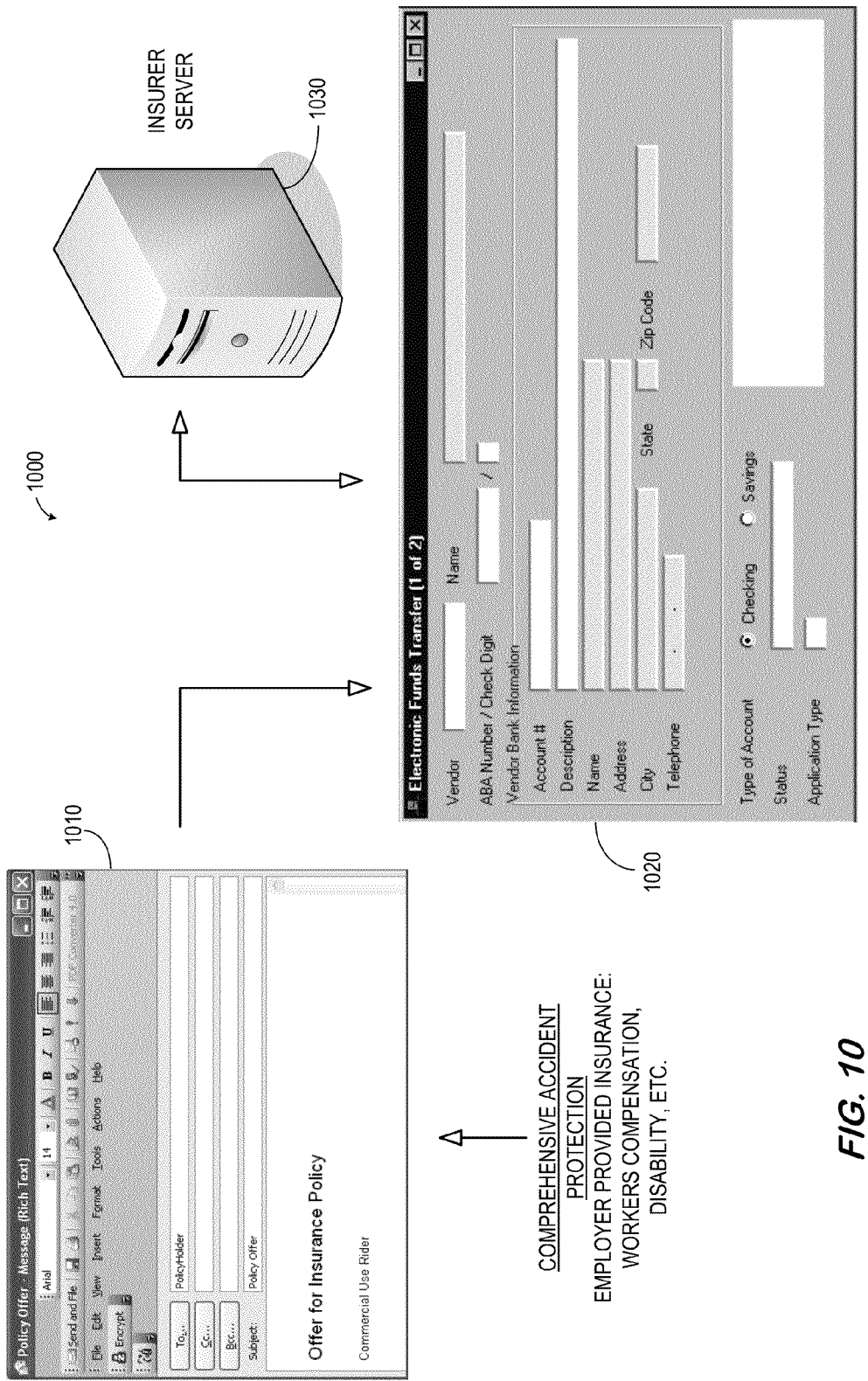
FIG. 10 illustrates employee interactions in accordance with some embodiments.

FIG. 10 illustrates employee interactions 1000 in accordance with some embodiments. Initially, a policy offer may be provided to an employee (that is, a potential policy holder). For example, an email 1010 may offer comprehensive accident protection to the employee and may include one or more URL links that may be selected by the employee. According to some embodiments, the email 1010 may be automatically created and transmitted to a large group of employees. When accepted, a payment display 1020 may be filled out by the employee to provide the insurance premium via an insurer server 1030. According to some embodiments, the information in the payment display 1020 may be at least partially automatically determined or filled in. For example, the insurer server 1030 or another device might pull information from a payroll or accounting program, such as QuickBooks® available from Intuit and/or ADP® payroll service products. The information could include payroll and/or banking information an may, according to some embodiments, be used to automatically calculate an appropriate insurance premium. In this way, an employee might, for example, arrange for a monthly premium to be automatically deducted from his or her checking account and/or through an Electronic Funds Transfer ("EFT") transaction. According to some embodiments, an employee may pay the premium directly or have it paid via a payroll deduction.

Thus, some embodiments may provide a supplemental bundle of insurance for accident based occurrences that compliment the employer provided insurance. The bundle may provide coverage that is portable and "sits" on top of the original employer coverages. According to some embodiments, the insurance is a guaranteed issue type product that does not require medical exams or other types of screening. According to some embodiments, the coverage is for Comprehensive Accident Protection ("CAP") for accidents that happen whether at home or at work. The underwriting and/or pricing may be determined, according to some embodiments, by pooling an employer with a broader employee pool. Bundled rates may be determined based on the employers industry and geographic location and/or employee specific information (e.g., gender and age).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with supporting workers' compensation insurance programs. Note, however, that other types of interactions may also benefit from the invention. For example, embodiments of the present invention may be used in connection with unemployment insurance and other types of employee benefit programs.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system associated with a workers' compensation insurance policy and supplemental bundled individual insurance policies, comprising:
    a communication device to receive employee information about a group of employees employed by an employer, wherein the employee information is to permit determination of a workers' compensation insurance premium for the workers' compensation insurance policy covering the employees and includes at least a job title and a salary for each employee of the group of employees;
    a computer processor for executing program instructions; and
    a memory, coupled to the computer processor, for storing program instructions for execution by the computer processor to:
        evaluate the employee information to determine the workers' compensation insurance premium for the workers' compensation insurance policy covering the group of employees;
        determine supplemental bundled insurance premiums for the supplemental bundled individual insurance policies for each employee of the group of employees, wherein the supplemental bundled individual insurance policies are comprised of individual policies covering different types of risks, wherein the supplemental bundled insurance premiums are determined based upon the employee information received for determining the workers' compensation insurance premium and wherein the supplemental bundled insurance premiums are contingent upon the employer's agreement to pay the workers' compensation insurance premium and are associated with at least one of: (i) short term disability insurance, (ii) long term disability insurance, (iii) accidental death insurance, (iv) accidental disability insurance, and (v) hospital accident insurance; and
        providing output data indicative of the determined supplemental bundled insurance premiums.

2. The system of claim 1, wherein the supplemental bundled insurance premiums are to be paid by each employee.

3. The system of claim 2, wherein each employee voluntarily indicates whether the supplemental bundled individual insurance policies will be purchased.

4. The system of claim 1, wherein the supplemental bundled insurance premiums are associated with at least two of: (i) short term disability insurance, (ii) long term disability insurance, (iii) accidental death insurance, (iv) accidental disability insurance, and (v) hospital accident insurance.

5. The system of claim 1, wherein different supplemental bundled insurance premiums are determined for different employees.

6. The system of claim 1, wherein the supplemental bundled insurance premiums are based at least in part on historical workers' compensation insurance claims associated with the employer.

7. The system of claim 1, wherein the workers' compensation insurance premium is based at least in part on historical supplemental bundled insurance claims associated with the group of employees.

8. The system of claim 1, wherein the supplemental bundled individual insurance policies are portable and owned by employees.

9. The system of claim 1, further comprising:
    an integrated benefits management platform to:
        receive information about a claim from a first employee;
        evaluate the information about the claim; and
        determine whether the claim is associated with the employer's workers' compensation insurance policy or the first employee's supplemental bundled individual insurance policies.

10. The system of claim 9, wherein the integrated benefits management platform is further to:
    provide a graphical user interface displaying aggregated information including information about both workers' compensation insurance claims and supplemental bundled insurance claims.

11. The system of claim 9, wherein the integrated benefits management platform is further to:
    receive from employees adjustments to the supplemental bundled individual insurance policies.

12. The system of claim 9, wherein the integrated benefits management platform is further to:
    facilitate payment of the supplemental bundled insurance premiums by employees.

13. The system of claim 9, wherein the integrated benefits management platform is further to:
    generate a rating associated with the employer or employee in accordance with both workers' compensation insurance claims and supplemental bundled insurance claims from employees.

14. The system of claim 9, wherein the integrated benefits management platform is further to:
    coordinate a return-to-work program associated with both the workers' compensation insurance policy and the supplemental bundled individual insurance policies.

15. The system of claim 9, wherein the integrated benefits management platform is further to:
    coordinate a wellness program associated with both the workers' compensation insurance policy and the supplemental bundled individual insurance policies.

16. A computer-implemented method associated with a workers' compensation insurance policy and supplemental bundled individual insurance policies, comprising:
    receiving via a communication device a data file including employee records associated with a group of employees employed by an employer, wherein the employee records are to permit determination of a workers' compensation insurance premium for the workers' compensation insurance policy covering the employees and include a job title and a salary for each employee of the group of employees;
    evaluating using a processor the employee records to calculate a workers' compensation insurance premium for a workers' compensation insurance policy covering the group of employees;
    calculating using the processor supplemental bundled insurance premiums for the supplemental bundled individual insurance policies for employees of the group of employees, wherein the supplemental bundled individual insurance policies are comprised of individual policies covering different types of risks, wherein the supplemental bundled insurance premiums are calculated based upon the employee records received for determining the workers' compensation insurance premium and wherein the supplemental bundled insurance premiums are contingent upon the employer's agreement to pay the workers' compensation insurance premium and are associated with at least two of: (i) short term disability insurance, (ii) long term disability insurance, (iii) accidental death insurance, (iv) accidental disability insurance, and (v) hospital accident insurance; and transmitting via the communication device indications of the workers' compensation insurance premium and supplemental bundled insurance premiums to a graphical user interface for review by an insurance company administrator or the employer.

17. The method of claim 16, further comprising:
receiving information about a claim from a first employee;
evaluating the information about the claim; and
determining whether the claim is associated with the employer's workers' compensation insurance policy or the first employee's supplemental bundled individual insurance policies.

18. The method of claim 17, wherein the information about the claim is received via at least one of: (i) a web interface, and (ii) a telephone call center.

19. A non-transitory computer-readable medium storing instructions adapted to be executed by a computer processor to perform a method, said method comprising:
receiving employee records associated with a group of employees employed by an employer, wherein the employee records are to permit determination of a workers' compensation insurance premium for a workers' compensation insurance policy covering the employees and include a job title and a salary for each employee of the group of employees;
calculating a workers' compensation insurance premium, for a workers' compensation insurance policy covering the group of employees, based on the employee records;
calculating using the processor supplemental bundled insurance premiums for supplemental bundled individual insurance policies for employees of the group of employees, wherein the supplemental bundled individual insurance policies are comprised of individual policies covering different types of risks, wherein the calculated supplemental bundled insurance premiums are based upon the employee records received for determining the workers' compensation insurance premium and wherein the supplemental bundled insurance premiums are contingent upon the employer's agreement to pay the workers' compensation insurance premium and are associated with at least two of: (i) short term disability insurance, (ii) long term disability insurance, (iii) accidental death insurance, (iv) accidental disability insurance, and (v) hospital accident insurance; and
transmitting via a communication device indications of the workers' compensation insurance premium and supplemental bundled insurance premiums for display on a graphical user interface for review by an insurance company administrator or the employer.

20. The medium of claim 19, wherein said calculation of the workers' compensation insurance premium is further based on at least two of: (i) employee salaries, (ii) historic workers' compensation insurance claims associated with the employer, (iii) historic supplemental bundled insurance claims made by employees, (iv) a standard industrial classification code associated with the employer, and (v) a geographic location.

21. The medium of claim 19, wherein said calculation of the supplemental bundled insurance premiums is further based on at least two of: (i) employee salaries, (ii) historic workers' compensation insurance claims associated with the employer, (iii) historic supplemental bundled insurance claims made by employees, (iv) a standard industrial classification code associated with the employer, (v) a geographic location, (vi) employee ages, (vii) employee genders, and (viii) employee job titles.

\* \* \* \* \*